(12) United States Patent
Bao et al.

(10) Patent No.: US 12,177,717 B2
(45) Date of Patent: Dec. 24, 2024

(54) METHOD AND APPARATUS FOR CONFIGURING QUALITY OF SERVICE PARAMETER

(71) Applicant: VIVO MOBILE COMMUNICATION CO., LTD., Guangdong (CN)

(72) Inventors: Wei Bao, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 324 days.

(21) Appl. No.: 17/729,542

(22) Filed: Apr. 26, 2022

(65) Prior Publication Data

US 2022/0248257 A1 Aug. 4, 2022

Related U.S. Application Data

(63) Continuation of application No. PCT/CN2020/125416, filed on Oct. 30, 2020.

(30) Foreign Application Priority Data

Nov. 1, 2019 (CN) .......................... 201911061489.2

(51) Int. Cl.
*H04W 28/02* (2009.01)
*H04L 1/1607* (2023.01)
(Continued)

(52) U.S. Cl.
CPC ....... *H04W 28/0268* (2013.01); *H04L 1/1671* (2013.01); *H04L 1/1812* (2013.01); *H04W 72/543* (2023.01); *H04W 76/19* (2018.02)

(58) Field of Classification Search
CPC .......... H04W 28/0268; H04W 72/543; H04W 76/19; H04W 76/14; H04W 28/18;
(Continued)

(56) References Cited

U.S. PATENT DOCUMENTS

2022/0014973 A1* 1/2022 Perras ................... H04L 1/0017
2022/0287115 A1* 9/2022 Hu ..................... H04W 28/0268
(Continued)

OTHER PUBLICATIONS

International Search Report and Written Opinion for Application No. PCT/CN2020/125416, dated Jan. 28, 2021, 5 Pages.
(Continued)

*Primary Examiner* — Harry H Kim
(74) *Attorney, Agent, or Firm* — BROOKS KUSHMAN P.C.

(57) ABSTRACT

A method and an apparatus for configuring a quality of service parameter are disclosed. The method for configuring a quality of service parameter is applied to a network-side device and includes: configuring a mapping relationship between a QoS parameter set and an SLRB parameter set for a terminal; in a case that a QoS parameter of the terminal matches none of configured QoS parameter sets, allowing the terminal to trigger RRC connection establishment; or indicating a default SLRB parameter set to the terminal, where the default SLRB parameter set is to be used by the terminal in a case that a QoS parameter of the terminal matches none of configured QoS parameter sets.

20 Claims, 4 Drawing Sheets

(51) Int. Cl.
*H04L 1/1812* (2023.01)
*H04L 1/1829* (2023.01)
*H04W 24/02* (2009.01)
*H04W 28/18* (2009.01)
*H04W 72/23* (2023.01)
*H04W 72/543* (2023.01)
*H04W 76/10* (2018.01)
*H04W 76/14* (2018.01)
*H04W 76/19* (2018.01)

(58) Field of Classification Search
CPC . H04W 24/02; H04W 72/23; H04W 28/0252; H04W 76/10; H04L 1/1671; H04L 1/1812; H04L 1/1854; H04L 1/1861; H04L 1/1864; H04L 1/1816
See application file for complete search history.

(56) References Cited

U.S. PATENT DOCUMENTS

2022/0330358 A1* 10/2022 Orsino .................. H04W 76/14
2022/0369154 A1* 11/2022 Hu .................... H04W 28/0263
2023/0171795 A1* 6/2023 Di Girolamo ........ H04W 72/51
370/329

OTHER PUBLICATIONS

ITL, "Consideration on Default SLRB," 3GPP TSG-RAN WG2 #107bis, Agenda item 6.4.6, Oct. 14-18, 2019, R2-1913867 (Resubmission of R2-1911423), Chongqing, China, 2 Pages.
Huawei et al., "Further Details of Uu RRC Procedures for Sidelink," 3GPP TSG-RAN WG2 #107bis, Agenda item 6.4.2, Oct. 14-18, 2019, R2-1913708, Chongqing, China, 8 Pages.
Samsung, "Discussion on Default SLRB and HARQ Configuration," 3GPP TSG-RAN WG2 #107bis, Agenda item 6.4.6, Oct. 14-18, 2019, R2-1912631 (Revision of R2-1911122), Chongqing, China, 4 Pages.
Samsung, "Remaining Issues on Handling of SLRB Configuration," 3GPP TSG-RAN WG2 #107bis, AAgenda item 6.4.2, Oct. 14-18, 2019, R2-1912440, Chongqing, China, 3 Pages.
Qualcomm Incorporated, "QoS for NR V2X," 3GPP TSG-RAN WG2 #105bis, Agenda item 11.4.5, May 13-17, 2019, R2-1907579 (was R2-1905196), Reno, NV, USA, 5 Pages.

* cited by examiner

METHOD AND APPARATUS FOR CONFIGURING QUALITY OF SERVICE PARAMETER

CROSS-REFERENCE TO RELATED APPLICATIONS

This application is a continuation of PCT International Application No. PCT/CN2020/125416 filed on Oct. 30, 2020, which claims priority to Chinese Patent Application No. 201911061489.2, filed on Nov. 1, 2019, which are incorporated herein by reference in their entireties.

TECHNICAL FIELD

The present invention relates to the field of communications technologies, and in particular, to a method and an apparatus for configuring a quality of service parameter.

BACKGROUND

A Long Term Evolution (LTE) system supports sidelink (sidelink, or side link), as shown in FIG. 1, sidelink is used for direct data communication between user equipments (UE) without intervention of a network device, uplink is for uplink transmission, and downlink is for downlink transmission.

Currently, for a connected-state UE, UE at a sending end may report quality of service (QoS) information of a to-be-sent sidelink service to a serving base station, and the serving base station configures sidelink radio bearer (SLRB) mapping and related transmission parameters for the UE. The UE establishes an SLRB and configures a corresponding parameter based on a configuration of the serving base station, so as to carry a QoS flow for data transmission.

The connected-state UE at the sending end may exchange radio resource control (RRC) dedicated signaling with the serving base station. Dedicated signaling has great flexibility, and can be used for reporting whatever QoS parameters of the UE to the base station truthfully, so as to obtain the corresponding SLRB mapping and configuration. However, the UE in an idle state and/or inactive state is incapable of exchanging RRC dedicated signaling, and the base station can use only common signaling, such as system information block (SIB), to send QoS, SLRB mapping, and corresponding parameters to the UE. Considering resource overheads and efficiency, it is impossible to list all QoS in the SIB message. The most proper way is to list common QoS characteristics, SLRB mapping, and parameters corresponding to the SLRB. In this way, it is inevitable that some QoS to be initiated by the UE does not conform to listed characteristics, and there is uncertainty in mapping and transmission of such QoS flows.

SUMMARY

Embodiments of the present invention provide a method and an apparatus for configuring a quality of service parameter.

According to a first aspect, an embodiment of the present invention provides a method for configuring a quality of service parameter, applied to a network-side device and including:
configuring a mapping relationship between a QoS parameter set and an SLRB parameter set for a terminal; and
in a case that a QoS parameter of the terminal matches none of configured QoS parameter sets, allowing the terminal to trigger RRC connection establishment; or indicating a default SLRB parameter set to the terminal, where the default SLRB parameter set is to be used by the terminal in a case that a QoS parameter of the terminal matches none of configured QoS parameter sets.

According to a second aspect, an embodiment of the present invention provides a method for configuring a quality of service parameter, applied to a terminal and including:
obtaining a mapping relationship between a QoS parameter set and an SLRB parameter set; and
performing matching between a QoS parameter of an arriving QoS service flow and the QoS parameter set, and in a case that the QoS parameter matches none of the QoS parameter sets, using a default SLRB parameter set to transmit the QoS service flow or triggering RRC connection establishment.

According to a third aspect, an embodiment of the present invention further provides an apparatus for configuring a quality of service parameter, applied to a network-side device and including:
a configuration module, configured to configure a mapping relationship between a QoS parameter set and an SLRB parameter set for a terminal; and
a processing module, configured to: in a case that a QoS parameter of the terminal matches none of configured QoS parameter sets, allow the terminal to trigger RRC connection establishment; or indicate a default SLRB parameter set to the terminal, where the default SLRB parameter set is to be used by the terminal in a case that a QoS parameter of the terminal matches none of configured QoS parameter sets.

According to a fourth aspect, an embodiment of the present invention provides an apparatus for configuring a quality of service parameter, applied to a terminal and including:
an obtaining module, configured to obtain a mapping relationship between a QoS parameter set and an SLRB parameter set; and
a processing module, configured to: perform matching between a QoS parameter of an arriving QoS service flow and the QoS parameter set, and in a case that the QoS parameter matches none of the QoS parameter sets, use a default SLRB parameter set to transmit the QoS service flow, or trigger RRC connection establishment.

According to a fifth aspect, an embodiment of the present invention further provides a communications device, including a processor, a memory, and a computer program stored in the memory and capable of running on the processor, where when the computer program is executed by the processor, the steps of the foregoing method for configuring a quality of service parameter are implemented.

According to a sixth aspect, an embodiment of the present invention provides a computer-readable storage medium, where a computer program is stored in the computer-readable storage medium, and when the computer program is executed by a processor, the steps of the foregoing method for configuring a quality of service parameter are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
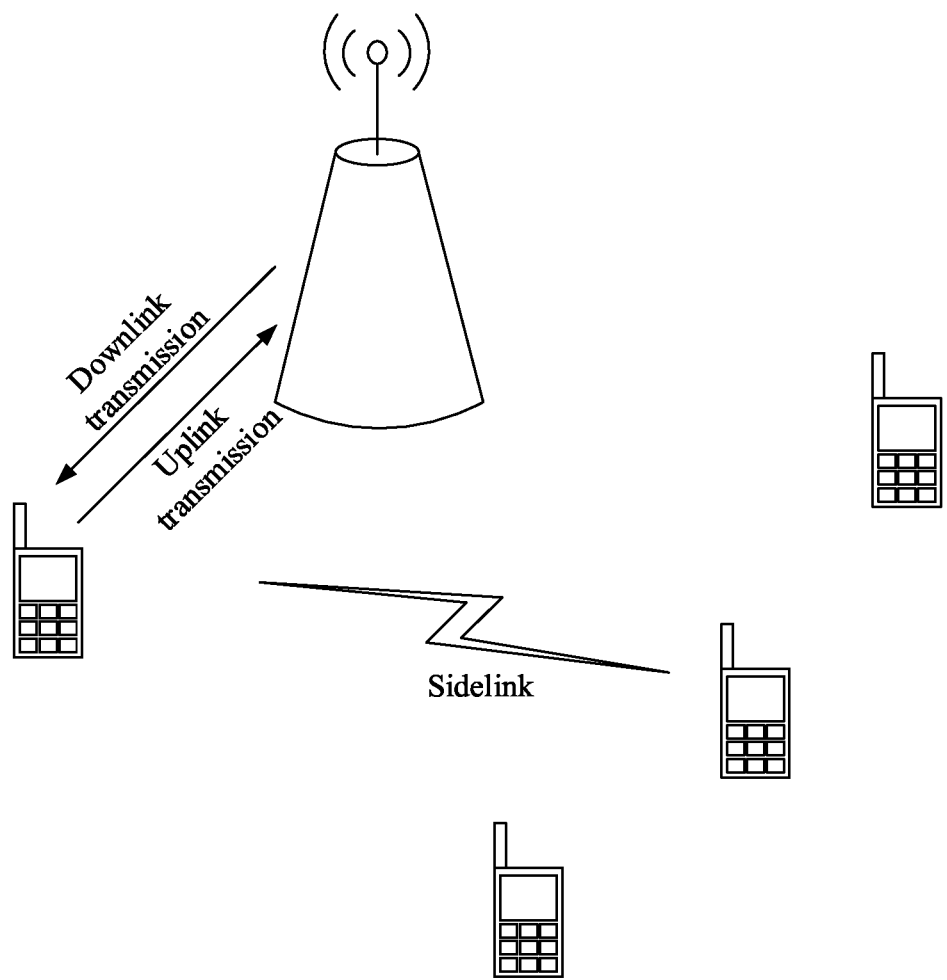
FIG. 1 is a schematic diagram of a sidelink in an LTE system.

Example embodiments of the present invention will be described below in more detail with reference to the accompanying drawings. Although the accompanying drawings show example embodiments of the present invention, it should be understood that the present invention may be implemented in various forms and should not be limited by the embodiments described herein. Instead, these embodiments are provided so that the present invention will be better understood, and the scope of the present invention can be fully conveyed to those skilled in the art.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. Use of "and/or" in the specification and claims represents at least one of connected objects.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the global system for mobile communications GSM). The OFDMA system may implement radio technologies such as ultra mobile broadband (UMB), Evolved-UTRA (E-UTRA), IEEE 802.11 (Wi-Fi), IEEE 802.16 (WiMAX), IEEE 802.20, or Flash-OFDM. The UTRA and E-UTRA are parts of the universal mobile telecommunications system (UMTS). LTE and advanced LTE (such as LTE-A) are new versions of UMTS that use E-UTRA. UTRA, E-UTRA, UMTS, LTE, LTE-A, and GSM are cited from descriptions in the documentation of the organization named "3rd Generation Partnership Project" (3GPP). The CDMA2000 and UMB are cited from descriptions in the documentation of the organization named "3rd Generation Partnership Project 2" (3GPP2). Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Design of LTE sidelink is applicable to specific public security transactions (such as emergency communication in disaster-stricken venues such as fireplaces or earthquakes), vehicle to everything (V2x) communication, or the like. Vehicle to everything communication includes various services, such as basic security communication, advanced (automatic) driving, formation, or sensor extension. LTE sidelink supports only broadcast communication, and therefore is mainly used for basic security communication. Other advanced V2X services with strict quality of service (QoS) requirements in terms of delay and reliability need to be supported by using new radio (NR) sidelink.

The 5G NR system may be used in operating frequency bands above 6 GHz that are not supported by LTE, and supports a larger working bandwidth. However, the current NR system supports only an interface between a base station and a terminal, but not a sidelink interface for direct communication between terminals.

A sidelink interface may be also referred to as a PC5 interface. Currently, sidelink transmission is mainly in several transmission forms: broadcast, groupcast, and unicast. As the name implies, unicast is one-to-one (one to one) transmission, groupcast is one-to-many (one to many) transmission, and broadcast is also one-to-many transmission. However, broadcast has no concept that UEs belong to one group. Currently, sidelink unicast and groupcast communication supports a physical layer hybrid automatic repeat request (HARQ) feedback mechanism.

There are a total of two resource allocation modes for sidelink UEs:

(1) Base station scheduling mode (Mode 1): BS schedules SL resource(s) to be used by UE for SL transmission(s), that is, the network-side device (base station) controls and allocates resources for each UE.

(2) UE autonomous mode (Mode 2) UE determines, i.e. BS does not schedule, SL transmission resource(s) within SL resources configured by BS/network or preconfigured SL resources, that is, each UE autonomously selects resources.

Currently, for connected-state UE, the UE at the sending end may report QoS information of a to-be-sent sidelink service to a serving base station, and the serving base station configures the SLRB mapping and related transmission parameters for the UE. The UE establishes an SLRB and configures a corresponding parameter based on a configuration of the serving base station, so as to carry a QoS flow for data transmission.

The connected-state UE at the sending end may exchange radio resource control (RRC) dedicated signaling with the serving base station. Dedicated signaling has great flexibility, and can be used for reporting whatever QoS parameters of the UE to the base station truthfully, so as to obtain the corresponding SLRB mapping and configuration. However, the UE in an idle state and/or inactive state is incapable of exchanging RRC dedicated signaling, and the base station can use only common signaling, such as system information block (SIB), to send QoS, SLRB mapping, and corresponding parameters to the UE. Considering resource overheads and efficiency, it is impossible to list all QoS in the SIB message. The most proper way is to list common QoS characteristics, SLRB mapping, and parameters corresponding to the SLRB. In this way, it is inevitable that some QoS to be initiated by the UE does not conform to listed characteristics, and there is uncertainty in mapping and transmission of such QoS flows.

The embodiments of the present invention provide a method and an apparatus for configuring a quality of service parameter, so as to enable all terminals to configure quality of service parameters according to network expectation, to improve transmission efficiency and user experience.

Figure 2:
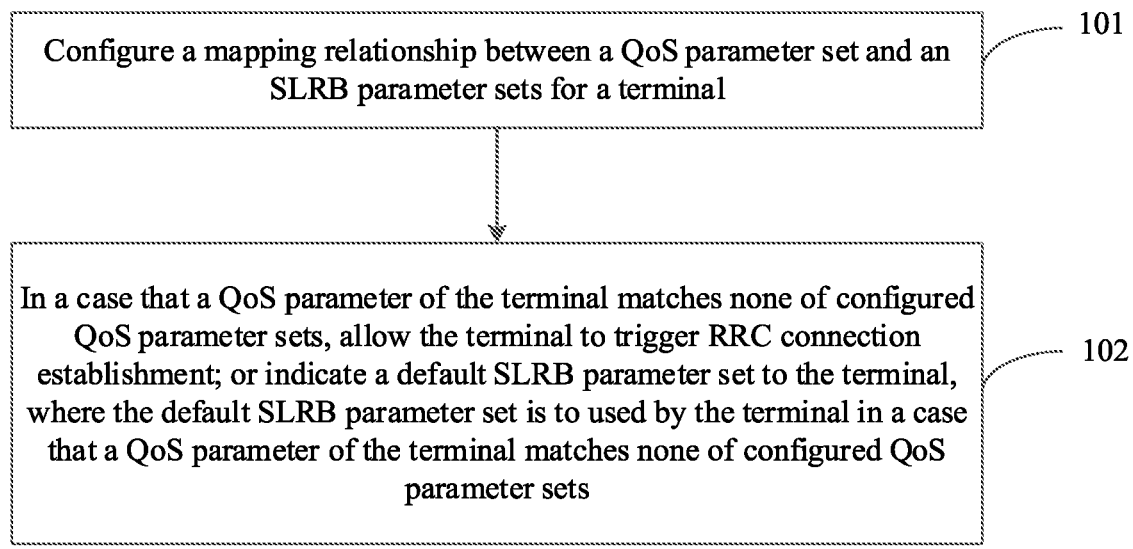
FIG. 2 is a schematic flowchart of a method for configuring a quality of service parameter for a network-side device according to an embodiment of the present invention.

An embodiment of the present invention provides a method for configuring a quality of service parameter, applied to a network-side device. As shown in FIG. 2, the method includes:

Step 101: Configure a mapping relationship between a QoS parameter set and an SLRB parameter set for a terminal.

Step 102: In a case that a QoS parameter of the terminal matches none of configured QoS parameter sets, allow the terminal to trigger RRC connection establishment; or indicate a default SLRB parameter set to the terminal, where the default SLRB parameter set is to be used by the terminal in a case that a QoS parameter of the terminal matches none of configured QoS parameter sets.

In this embodiment, the network-side device configures the mapping relationship between the QoS parameter set and the SLRB parameter set for the terminal, and allows the terminal to trigger RRC connection establishment in the case that the QoS parameter of the terminal matches none of the configured QoS parameter sets, or indicates the default SLRB parameter set to the terminal, where the default SLRB parameter set is to be used in the case that the QoS parameter of the terminal matches none of the configured QoS parameter sets. In this way, the terminal in different states can obtain a corresponding SLRB parameter set, so that all terminals can configure quality of service parameters according to network expectation, thereby better controlling sidelink data transmission and improving user experience.

The QoS parameter is a quality of service parameter of the sidelink service, including but not limited to: a service type, a service delay requirement, a service priority, a block error rate requirement of service, an evaluation window size, a maximum data burst volume, a data flow rate parameter, a communication distance parameter of service, and a preemption parameter of service.

The configuring a mapping relationship between a QoS parameter set and an SLRB parameter set for a terminal includes any one of the following:

sending configuration information to the terminal by using common signaling, where the configuration information includes the mapping relationship between the QoS parameter set and the SLRB parameter set, and specifically, the common signaling may be system information; and preconfiguring the mapping relationship between the QoS parameter set and the SLRB parameter set for the terminal.

For terminals in an idle state or inactive state, the mapping relationship between the QoS parameter set and the SLRB parameter set may be configured by using system information; for offline terminals, the mapping relationship between the QoS parameter set and the SLRB parameter set may be preconfigured; and for terminals in a connected state, the mapping relationship between the QoS parameter set and the SLRB parameter set may be configured by using RRC dedicated signaling. In order to reduce signaling overheads, the mapping relationship between the QoS parameter set and the SLRB parameter set may be alternatively configured for the terminal by using common signaling.

Optionally, the method further includes:

receiving a first configuration request message from the terminal, where the first configuration request message is sent by the terminal when a QoS flow arrives, the first configuration request message is for requesting to obtain the configuration information, and the network-side device may configure the mapping relationship between the QoS parameter set and the SLRB parameter set for the terminal after receiving the first configuration request message from the terminal.

Optionally, the configuration information further includes the default SLRB parameter set; or the default SLRB parameter set is preconfigured.

When the configuration information includes the default SLRB parameter set, the configuration information further includes default parameter indication information, and the default parameter indication information indicates that one SLRB parameter set in the configuration information is the default SLRB parameter set.

Optionally, the configuration information may further indicate in an explicit manner or an implicit manner that the terminal triggers RRC connection establishment in a case that a QoS parameter of a to-be-initiated service matches none of the QoS parameter sets.

In a specific example, the indicating in an implicit manner that the terminal triggers RRC connection establishment in a case that a QoS parameter of a to-be-initiated service matches none of the QoS parameter sets includes:

in a case that the default SLRB parameter set is not included in the configuration information, triggering by default or allowing the terminal to trigger RRC connection establishment in a case that the QoS parameter of the to-be-initiated service matches none of the QoS parameter sets.

In another specific example, the indicating in an explicit manner that the terminal triggers RRC connection establishment in a case that a QoS parameter of a to-be-initiated service matches none of the QoS parameter sets includes:

indicating, by using first signaling, that the terminal triggers RRC connection establishment in a case that the QoS parameter of the to-be-initiated service matches none of the QoS parameter sets.

The to-be-initiated service is configured by the network-side device or is predefined.

After an RRC connection has been established, the method further includes:

receiving a second configuration request message of the terminal, where the second configuration request message includes a QoS requirement of the terminal; and sending, to the terminal, an SLRB parameter corresponding to the QoS requirement. In this way, the network-side device can dynamically configure the SLRB parameter for the terminal according to the QoS requirement of the terminal.

The SLRB parameter set includes at least one of the following parameters:

an L1-layer transmission parameter;

an L2-layer transmission parameter;

an indication on whether a media access control MAC performs HARQ retransmission; and the maximum number of retransmissions.

In a case that the SLRB parameter set includes a parameter indicating whether the MAC performs HARQ retransmission, the configuration information further indicates in an explicit manner or an implicit manner that the terminal triggers RRC connection establishment in a case that a configured HARQ feedback resource does not match a terminal capability.

Optionally, after an RRC connection has been established, the method further includes: receiving a HARQ feedback resource request message from the terminal, where the HARQ feedback resource request message is for requesting to obtain a HARQ feedback resource matching the terminal capability.

For example, the configured HARQ feedback resource is at a fixed position, for example, being at a fixed position 1 ms or 3 ms behind the transmission resource. If the HARQ feedback resource configured for the terminal is fixed at 1 ms, and the terminal has weak capability and cannot perform HARQ feedback at the fixed position of 1 ms behind the transmission resource, the terminal needs to trigger RRC connection establishment and enter the connected state, to request the network-side device for a resource pool with a 3-ms feedback delay.

When the SLRB parameter set includes a parameter indicating whether the MAC performs HARQ retransmission, the configuration information further includes a HARQ feedback delay parameter, and the HARQ feedback delay parameter includes 1 ms and 3 ms, for example, indicating sending a feedback in 1 ms after data transmission or sending a feedback in 3 ms after data transmission.

Figure 3:
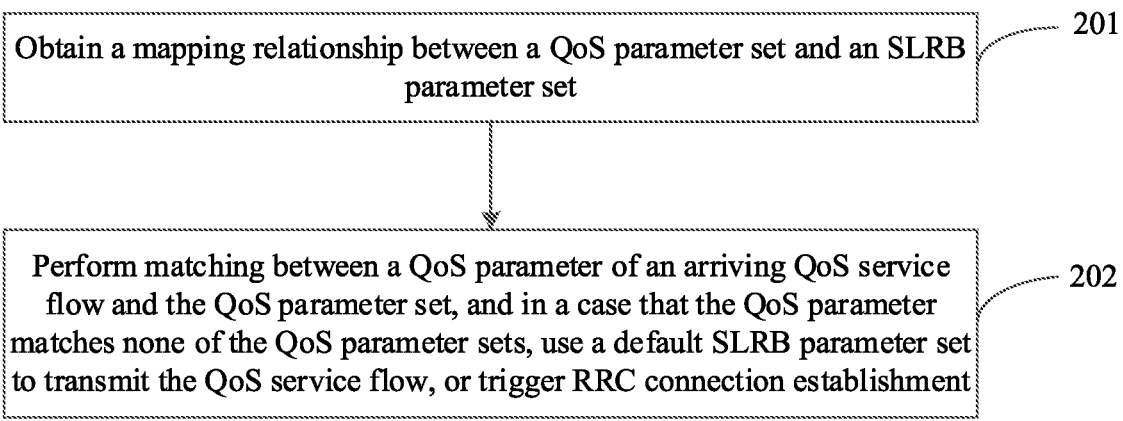
FIG. 3 is a schematic flowchart of a method for configuring a quality of service parameter for a terminal according to an embodiment of the present invention.

An embodiment of the present invention further provides a method for configuring a quality of service parameter, applied to a terminal. As shown in FIG. 3, the method includes:

Step 201: Obtain a mapping relationship between a QoS parameter set and an SLRB parameter set.

Step 202: Perform matching between a QoS parameter of an arriving QoS service flow and the QoS parameter set, and in a case that the QoS parameter matches none of the QoS parameter sets, use a default SLRB parameter set to transmit the QoS service flow, or trigger RRC connection establishment.

In this embodiment, the network-side device configures the mapping relationship between the QoS parameter set and the SLRB parameter set for the terminal, and allows the terminal to trigger RRC connection establishment in the case that the QoS parameter of the terminal matches none of the configured QoS parameter sets, or indicates the default SLRB parameter set to the terminal, where the default SLRB parameter set is to be used in the case that the QoS parameter of the terminal matches none of the configured QoS parameter sets. In this way, the terminal in different states can obtain a corresponding SLRB parameter set, so that all terminals can configure quality of service parameters according to network expectation, thereby better controlling sidelink data transmission and improving user experience.

Optionally, the performing matching between a QoS parameter of an arriving QoS service flow and the QoS parameter set includes at least one of the following:

in a case that values of at least part of QoS parameters of the QoS service flow are equal to values of corresponding parameters in one QoS parameter set, determining that the QoS parameter of the QoS service flow matches the QoS parameter set; and in a case that the values of at least part of QoS parameters of the QoS service flow fall within value ranges of corresponding parameters in one QoS parameter set, determining that the QoS parameter of the QoS service flow matches the QoS parameter set.

Optionally, the obtaining a mapping relationship between a QoS parameter set and an SLRB parameter set that is configured by the network-side device includes any one of the following:

receiving configuration information sent by a network-side device by using common signaling, where the configuration information includes the mapping relationship between the QoS parameter set and the SLRB parameter set, and specifically, the common signaling may be system information; and obtaining the mapping relationship that is between the QoS parameter set and the SLRB parameter set and that is preconfigured by the network-side device.

For terminals in an idle state or inactive state, the mapping relationship between the QoS parameter set and the SLRB parameter set may be configured by using system information; for offline terminals, the mapping relationship between the QoS parameter set and the SLRB parameter set may be preconfigured; and for terminals in a connected state, the mapping relationship between the QoS parameter set and the SLRB parameter set may be configured by using RRC dedicated signaling. In order to reduce signaling overheads, the mapping relationship between the QoS parameter set and the SLRB parameter set may be alternatively configured for the terminal by using common signaling.

Optionally, the method further includes:

if a QoS flow arrives, sending a first configuration request message to the network-side device to request to obtain the configuration information. The network-side device may configure the mapping relationship between the QoS parameter set and the SLRB parameter set for the terminal after receiving the first configuration request message from the terminal.

Optionally, the configuration information further includes the default SLRB parameter set; or the default SLRB parameter set is preconfigured.

When the configuration information includes the default SLRB parameter set, the configuration information further includes default parameter indication information, and the default parameter indication information indicates that one SLRB parameter set in the configuration information is the default SLRB parameter set.

Optionally, the configuration information may further indicate in an explicit manner or an implicit manner that the terminal triggers RRC connection establishment in a case that a QoS parameter of a to-be-initiated service matches none of the QoS parameter sets.

In the implicit manner, in a case that the default SLRB parameter set is not included in the configuration information and that a QoS parameter of a to-be-initiated service matches none of the QoS parameter sets in the configuration information, RRC connection establishment may be triggered.

In the explicit manner, in a case that first signaling is received from the network-side device and that the QoS parameter of the to-be-initiated service matches none of the QoS parameter sets in the configuration information, RRC connection establishment may be triggered, where the first signaling indicates that the terminal triggers RRC connection establishment in the case that the QoS parameter of the to-be-initiated service matches none of the QoS parameter sets.

The to-be-initiated service is configured by the network-side device or is predefined.

After RRC connection establishment is triggered, the method further includes:

sending a second configuration request message to the network-side device, where the second configuration request message includes a QoS requirement of the terminal; and receiving an SLRB parameter that is corresponding to the QoS requirement and that is sent by the network-side device. In this way, the network-side device can dynamically configure the SLRB parameter for the terminal according to the QoS requirement of the terminal.

The SLRB parameter set includes at least one of the following parameters:

an L1-layer transmission parameter;
an L2-layer transmission parameter;
an indication on whether a media access control MAC performs HARQ retransmission; and
the maximum number of retransmissions.

In a case that the SLRB parameter set includes a parameter indicating whether the MAC performs HARQ retransmission, the configuration information further indicates in an explicit manner or an implicit manner that the terminal triggers RRC connection establishment in a case that a configured HARQ feedback resource does not match a terminal capability.

Optionally, after an RRC connection has been established, the method further includes:

sending a HARQ feedback resource request message to the network-side device, where the HARQ feedback resource request message is for requesting to obtain a HARQ feedback resource matching the terminal capability.

For example, the configured HARQ feedback resource is at a fixed position, for example, being at a fixed position 1 ms or 3 ms behind the transmission resource. If the HARQ feedback resource configured for the terminal is fixed at 1 ms, and the terminal has weak capability and cannot perform HARQ feedback at the fixed position of 1 ms behind the transmission resource, the terminal needs to trigger RRC connection establishment and enter the connected state, to request the network-side device for a resource pool with a 3-ms feedback delay.

When the SLRB parameter set includes a parameter indicating whether the MAC performs HARQ retransmission, the configuration information further includes a HARQ feedback delay parameter. The HARQ feedback delay parameter includes 1 ms and 3 ms.

Based on the parameter indicating whether the MAC performs HARQ retransmission and the HARQ feedback delay parameter, the terminal selects a resource pool to send data of the QoS service flow, where a feedback delay of the selected resource pool is not greater than the HARQ feedback delay parameter. When none of the resource pools configured by the network side for the terminal meet the requirement, the terminal initiates RRC connection establishment, and after an RRC connection has been established, requests for an appropriate resource from the network side through the RRC connection.

For example, UE1 needs to send a service 1, and the network side configures requiring no HARQ feedback for the service 1. In this case, the UE1 selects a resource pool without HARQ feedback resource to send the service 1.

UE2 needs to send a service 2, and the network side configures requiring a HARQ feedback for the service 2. Due to a low service delay requirement, a configured HARQ feedback delay parameter is 3 ms, and the UE2 selects a resource pool with a HARQ feedback resource and a feedback delay not greater than 3 ms to send the service 2. If resource pools with feedback delays of 1 ms and 3 ms are configured for the UE2, the UE2 may use the resource pool with feedback delay of 1 ms to send the service 2, or use the resource pool with feedback delay of 3 ms to send the service 2. If a resource pool with feedback delay of 1 ms is configured for the UE2, the UE2 may use the resource pool with feedback delay of 1 ms to send the service 2. Only when no resource pools with feedback delays of 1 ms and 3 ms are configured for the UE2, it indicates that all resource pools configured by the network side for the UE2 do not meet the requirement, and the UE2 needs to enter the connected state to request for an appropriate resource pool from the network side. Certainly, it may be alternatively defined that the UE2 needs to select the resource pool with feedback delay of 3 ms.

UE3 needs to send a service 3, and the network side configures requiring a HARQ feedback for the service 3. Due to a high service delay requirement, a configured HARQ feedback delay parameter is 1 ms, and the UE3 selects a resource pool with a HARQ feedback resource and a feedback delay not greater than 1 ms to send the service 3.

In a case that there are a plurality of QoS service flows, selecting a first resource pool to send data of all QoS service flows requiring HARQ feedback, where a feedback delay of the first resource pool is not greater than a first HARQ feedback delay parameter, and the first HARQ feedback delay parameter is a HARQ feedback delay parameter with a shortest delay corresponding to the plurality of QoS service flows.

For example, when the HARQ feedback delay parameter includes 1 ms and 3 ms, the resource pools are sorted in descending order of feedback delays:

a resource pool with feedback delay not greater than 1 ms;
a resource pool with feedback delay not greater than 3 ms; and
a resource pool without feedback resource.

When the UE has a plurality of services, for example, including a service with a configured HARQ feedback delay parameter being 1 ms, a service with a configured HARQ feedback delay parameter being 3 ms, and a service requiring no HARQ feedback, the UE needs to select a resource pool with feedback delay not greater than 1 ms based on a service with the highest requirement, to send the services requiring HARQ feedback. The service requiring no HARQ feedback is sent separately, and it is explicitly indicated in physical layer signaling that the service does not require feedback.

In a specific embodiment, idle-state, inactive-state, or offline terminals may obtain, from common signaling or preconfiguration of the network-side device, a specific SLRB parameter configuration and a mapping relationship that is between a QoS parameter set and an SLRB parameter set and that is related to a V2X service. Certainly, for the purpose of reducing overheads or delay of dedicated signaling exchange, the connected-state terminal may also obtain, from common signaling or preconfiguration of the network-side device, a specific SLRB parameter configuration and a mapping relationship that is between a QoS parameter set and an SLRB parameter set and that is related to a V2X service.

In a specific example, the mapping relationship between the QoS parameter set and the SLRB parameter set may be:
QoS parameter set x→SLRB ID y+SLRB parameter set z;
where
the QoS parameter set may include a combination of one or more of the following parameters:
service type, such as guaranteed bit rate (GBR), non-GBR, or critical delay GBR;
service delay requirement;
service priority;
block error rate requirement of service;
evaluation window size;
maximum data burst volume;
rate parameter of data stream;
communication distance parameter of service; and
preemption parameter of service.

The foregoing parameters basically include necessary parameters required by a QoS profile corresponding to a QoS flow (flow). However, during configuration, mapping and configuring all QoS parameters are possibly unnecessary. For example, main factors affecting whether QoS flows can be combined and sent together are: service type, delay, block error rate requirement, priority, and the like. In this case, during configuration, the network-side device may use the main factors as characteristics of a QoS parameter set, to reduce complexity and signaling overheads.

The SLRB ID is used to indicate a specific SLRB. This parameter does not necessarily need to be configured by the network-side device, and may be alternatively determined by the terminal itself.

The SLRB parameter set is an important factor in determining one SLRB configuration, and generally includes an L2 and/or L1 transmission parameter, such as a radio link control (RLC) and packet data convergence protocol (PDCP) configuration corresponding to SLRB, and channel priority, or may include configuration whether media access control (MAC) performs hybrid automatic repeat request (HARQ) retransmission, and the maximum number of retransmissions, or may include an L1 parameter.

The network-side device may specifically configure the mapping relationship between the QoS parameter set and the SLRB parameter set as follows:
QoS parameter set 1→SLRB parameter set 1 (+SLRB ID 1);
QoS parameter set 2→SLRB parameter set 2 (+SLRB ID 2); default value
. . .
QoS parameter set n→SLRB parameter set n (+SLRB ID n).

The foregoing configuration manner may be sent to the terminal by using a SIB or in a preconfigured manner, and is stored by the terminal after being received by the terminal. When a service arrives and a related QoS service flow needs to be transmitted on the sidelink, the terminal performs matching between a QoS parameter of the arriving QoS service flow and the QoS parameter sets in the configuration. For example, if a QoS parameter set 2 is matched, the corresponding QoS parameter set 2 (and a corresponding SLRB ID 2) is selected to transmit the arriving QoS service flow.

Matching of the QoS parameter set may be performed in one of the following manners:

Each parameter in the QoS parameter set has a fixed value. When parameter values corresponding to the arriving QoS service flow are the same as the corresponding values, it indicates matching. Matching of all parameters may be considered to be matching of the entire QoS parameter set, or some important parameters may be defined, and matching of such important parameters may be considered to be matching.

The parameters in the QoS parameter set may be alternatively within specific value ranges. For example, the delay is less than (not greater than) x1 ms, or greater than (not less than) x2 ms, or even between x3 ms and x4 ms, and the block error rate is required to be lower than y1, or higher than y2, or between y3 and y4. When the parameter values corresponding to the arriving QoS service flow meet the requirements of the value ranges, it indicates matching. Matching of all parameters may be considered to be matching of the entire QoS parameter set, or some important parameters may be defined, and matching of such important parameters may be considered to be matching.

Matching may be performed on some parameters in the QoS parameter set in the foregoing first manner, and matching is performed on the other parameters in the QoS parameter set in the foregoing second manner. Finally, only matching of all the parameters may be considered to be matching of the entire QoS parameter set, or some important parameters may be defined, and matching of such important parameters may be considered to be matching.

Due to signaling overheads and efficiency, QoS service flows that actually arrive may be far more than configured n groups. For QoS service flows beyond this range, a default SLRB parameter set is required. One of existing SLRB parameter sets may be selected as the default SLRB parameter set. For example, the foregoing SLRB parameter set 2 (+SLRB ID 2) is used as the default SLRB parameter set, and an explicit flag may be used to represent the SLRB parameter set 2 (+SLRB ID 2) serving as the default SLRB parameter set. In this way, when an arriving QoS service flow of the UE does not conform to any one of the QoS parameter sets 1 to n, the default SLRB parameter set being the SLRB parameter set 2 (+SLRB ID 2) is directly used as configuration parameters for data transmission.

One SLRB parameter set and/or a corresponding SLRB ID may be alternatively defined as the default SLRB parameter set to be used when there is no matching QoS parameter set. For example, the network-side device may specifically configure the mapping relationship between the QoS parameter set and the SLRB parameter set as follows:
QoS parameter set 1→SLRB parameter set 1 (+SLRB ID 1);
QoS parameter set 2→SLRB parameter set 2 (+SLRB ID 2);
. . .
QoS parameter set n−1→SLRB parameter set n−1 (+SLRB ID n−1); and
default value→SLRB parameter set n (+SLRB ID n).

When a QoS service flow arriving at the terminal does not conform to any one of the QoS parameter sets 1 to n−1, the default SLRB parameter set being the SLRB parameter set n (+SLRB ID n) is directly used as configuration parameters for data transmission.

In the foregoing embodiment, the default SLRB parameter set is defined, so that the terminal can continue to work under the control of the network in a case that no matching QoS parameter set can be found.

In another embodiment, when the terminal cannot find a matching QoS parameter set from the common signaling and cannot further obtain an SLRB parameter set, the terminal may trigger RRC establishment to interact with the network-side device by using dedicated signaling, so that the terminal reports a QoS requirement to the network-side device, and the network-side device configures a more targeted SLRB parameter set.

The network-side device may indicate, in the following manners, whether to allow triggering RRC connection establishment, so as to report QoS parameters and obtain an SLRB parameter set.

(1) Implicit manner: For example, when there is a default SLRB parameter set in the common signaling, the terminal preferentially uses the default SLRB parameter set. Only when the network-side device configures no default SLRB parameter set, the terminal is allowed to trigger RRC connection establishment in a case that no matching QoS parameter set can be found.

(2) Explicit manner: The network-side device informs the terminal by using an explicit signaling indication in the common signaling whether the terminal is allowed to trigger RRC connection establishment in a case that no matching QoS parameter set can be found. Further, it may be prescribed by a protocol or configured by the network side that in the case of no matching QoS parameter set being found, triggering RRC connection establishment is allowed for which services or services satisfying what conditions. For example, in the case of no matching QoS parameter set being found, triggering RRC connection establishment is allowed for a service with a priority lower than a specific threshold (a smaller priority value indicates a higher priority), or with a delay less than a specific threshold, or with a block error rate less than a specific threshold, or the like.

When an explicit or implicit configuration is performed by the network side, the terminal implements execution according to a manner indicated by the network side. If the network side neither configures a default SLRB parameter set, nor allows the terminal to trigger RRC connection establishment in the case of no matching QoS parameter set being found, the terminal may find an appropriate SLRB parameter set from existing configuration to perform SLRB mapping and configuration.

In still another embodiment, when the terminal at the sending end is in an idle/inactive state, the terminal preferentially obtains, from a SIB message, the mapping relationship between the QoS parameter set and the SLRB parameter set and the SLRB configuration. The terminal may perform any one of the following actions:

(1) When the terminal finds a QoS parameter set that matches the arriving service QoS flow, a corresponding SLRB parameter set and SLRB ID are used for service transmission.

(2) If the terminal finds no QoS parameter set matching the arriving service QoS flow, and there is a default configuration flag, the default SLRB parameter set and SLRB ID are used for service transmission.

(3) If the terminal finds no QoS parameter set matching the arriving service QoS flow, there is no default configuration flag, and the network side allows triggering of RRC connection establishment, the terminal enters a connected state through RRC connection establishment to perform reporting and requesting by using dedicated signaling.

(4) If the terminal finds no QoS parameter set matching the arriving service QoS flow, there is no default configuration flag, and the network-side device does not allow triggering of RRC connection establishment, the terminal determines how to perform configuration and transmission.

When the terminal at the sending end is in a connected state, the terminal may interact with the network-side device by using RRC dedicated signaling. However, to reduce a specific amount of signaling, the terminal may perform any one of the following actions:

(1) When a new QoS flow arrives, the terminal directly reports QoS parameters and requests the network side to perform SLRB mapping and parameter configuration.

(2) When a new QoS flow arrives, the terminal first determines whether there is a corresponding configuration in the SIB, and if there is a corresponding configuration in the SIB, the corresponding configuration may be used directly.

(3) When a new QoS flow arrives, the terminal determines, based on QoS characteristics, whether to request for SLRB mapping and parameter configuration by using dedicated signaling or to use the configuration in the SIB. Generally, in a case of a high QoS requirement, SLRB mapping and parameter configuration are requested by using dedicated signaling; otherwise, the configuration in the SIB is used.

When the terminal is in an offline state, the terminal cannot obtain any information from the network side, and the SIB and dedicated signaling are unusable. In this case, the terminal needs to use preconfigured information. Generally, the preconfigured information is obtained when the terminal has a connection to the network side before. Content of the preconfiguration information is similar to that of the SIB information, with a difference in that the preconfiguration information includes no flag indicating whether triggering RRC connection establishment is allowed, because an offline user does not have any possibility of triggering RRC connection establishment. The terminal may perform any one of the following actions:

(1) When the terminal finds, from the preconfiguration information, a QoS parameter set that matches the arriving service QoS flow, a corresponding SLRB parameter set and SLRB ID are used for service transmission.

(2) If the terminal finds, from the preconfiguration information, no QoS parameter set matching the arriving service QoS flow, and there is a default configuration flag, the default SLRB parameter set and SLRB ID are used for service transmission.

(3) If the terminal finds, from the preconfiguration information, no QoS parameter set matching the arriving service QoS flow, and there is no default configuration flag, the terminal determines how to perform configuration and transmission. Generally, an approximation principle may be used to select an SLRB parameter set corresponding to a similar QoS parameter set.

Figure 4:
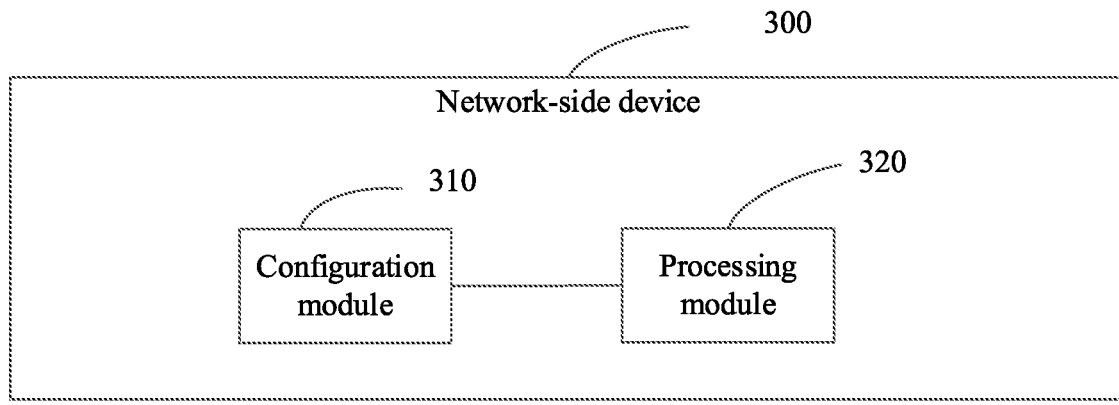
FIG. 4 is a schematic modular structural diagram of a network-side device according to an embodiment of the present invention.

An embodiment of the present invention further provides an apparatus for configuring a quality of service parameter, applied to a network-side device. As shown in FIG. 4, the network-side device 300 includes:

a configuration module 310, configured to configure a mapping relationship between a QoS parameter set and an SLRB parameter set for a terminal; and a processing module 320, configured to: in a case that a QoS parameter of the terminal matches none of configured QoS parameter sets, allow the terminal to trigger RRC connection establishment; or indicate a default SLRB parameter set to the terminal, where the default SLRB parameter set is to be used by the terminal in a case that a QoS parameter of the terminal matches none of configured QoS parameter sets.

In this embodiment, the network-side device configures the mapping relationship between the QoS parameter set and the SLRB parameter set for the terminal, and allows the terminal to trigger RRC connection establishment in the case that the QoS parameter of the terminal matches none of the configured QoS parameter sets, or indicates the default SLRB parameter set to the terminal, where the default SLRB parameter set is to be used in the case that the QoS parameter of the terminal matches none of the configured QoS parameter sets. In this way, the terminal in different states can obtain a corresponding SLRB parameter set, so that all terminals can configure quality of service parameters according to network expectation, thereby better controlling sidelink data transmission and improving user experience.

The configuration module 310 is configured to perform any one of the following:

sending configuration information to the terminal by using common signaling, where the configuration information includes the mapping relationship between the QoS parameter set and the SLRB parameter set, and specifically, the common signaling may be system information; and preconfiguring the mapping relationship between the QoS parameter set and the SLRB parameter set for the terminal.

For terminals in an idle state or inactive state, the mapping relationship between the QoS parameter set and the SLRB parameter set may be configured by using system information; for offline terminals, the mapping relationship between the QoS parameter set and the SLRB parameter set may be preconfigured; and for terminals in a connected state, the mapping relationship between the QoS parameter set and the SLRB parameter set may be configured by using RRC dedicated signaling. In order to reduce signaling overheads, the mapping relationship between the QoS parameter set and the SLRB parameter set may be alternatively configured for the terminal by using common signaling.

Optionally, the apparatus further includes:

a receiving module, configured to receive a first configuration request message from the terminal, where the first configuration request message is sent by the terminal when a QoS flow arrives, the first configuration request message is for requesting to obtain the configuration information, and the network-side device may configure the mapping relationship between the QoS parameter set and the SLRB parameter set for the terminal after receiving the first configuration request message from the terminal.

Optionally, the configuration information further includes the default SLRB parameter set; or the default SLRB parameter set is preconfigured.

When the configuration information includes the default SLRB parameter set, the configuration information further includes default parameter indication information, and the default parameter indication information indicates that one SLRB parameter set in the configuration information is the default SLRB parameter set.

Optionally, the configuration information may further indicate in an explicit manner or an implicit manner that the terminal triggers RRC connection establishment in a case that a QoS parameter of a to-be-initiated service matches none of the QoS parameter sets.

In a specific example, the indicating in an implicit manner that the terminal triggers RRC connection establishment in a case that a QoS parameter of a to-be-initiated service matches none of the QoS parameter sets includes:

in a case that the default SLRB parameter set is not included in the configuration information, triggering by default or allowing the terminal to trigger RRC connection establishment in a case that the QoS parameter of the to-be-initiated service matches none of the QoS parameter sets.

In another specific example, the indicating in an explicit manner that the terminal triggers RRC connection establishment in a case that a QoS parameter of a to-be-initiated service matches none of the QoS parameter sets includes:

indicating, by using first signaling, that the terminal triggers RRC connection establishment in a case that the QoS parameter of the to-be-initiated service matches none of the QoS parameter sets.

The to-be-initiated service is configured by the network-side device or is predefined.

After an RRC connection has been established, the receiving module is further configured to receive a second configuration request message of the terminal, where the second configuration request message includes a QoS requirement of the terminal; and send, to the terminal, an SLRB parameter corresponding to the QoS requirement. In this way, the network-side device can dynamically configure the SLRB parameter for the terminal according to the QoS requirement of the terminal.

The SLRB parameter set includes at least one of the following parameters:

an L1-layer transmission parameter;

an L2-layer transmission parameter;

an indication on whether a media access control MAC performs HARQ retransmission; and the maximum number of retransmissions.

In a case that the SLRB parameter set includes a parameter indicating whether the MAC performs HARQ retransmission, the configuration information further indicates in an explicit manner or an implicit manner that the terminal triggers RRC connection establishment in a case that a configured HARQ feedback resource does not match a terminal capability.

Optionally, after an RRC connection has been established, the receiving module is further configured to receive a HARQ feedback resource request message from the terminal, where the HARQ feedback resource request message is for requesting to obtain a HARQ feedback resource matching the terminal capability.

For example, the configured HARQ feedback resource is at a fixed position, for example, being at a fixed position 1 ms or 3 ms behind the transmission resource. If the HARQ feedback resource configured for the terminal is fixed at 1 ms, and the terminal has weak capability and cannot perform HARQ feedback at the fixed position of 1 ms behind the transmission resource, the terminal needs to trigger RRC connection establishment and enter the connected state, to request the network-side device for a resource pool with a 3-ms feedback delay.

To better achieve the foregoing objective, an embodiment of the present invention further provides a network-side device. The network-side device includes a processor, a memory, and a computer program stored in the memory and capable of running on the processor, where when the computer program is executed by the processor, the steps of the foregoing method for configuring a quality of service parameter are implemented, with same technical effects achieved. To avoid repetition, details are not described herein again.

Figure 5:
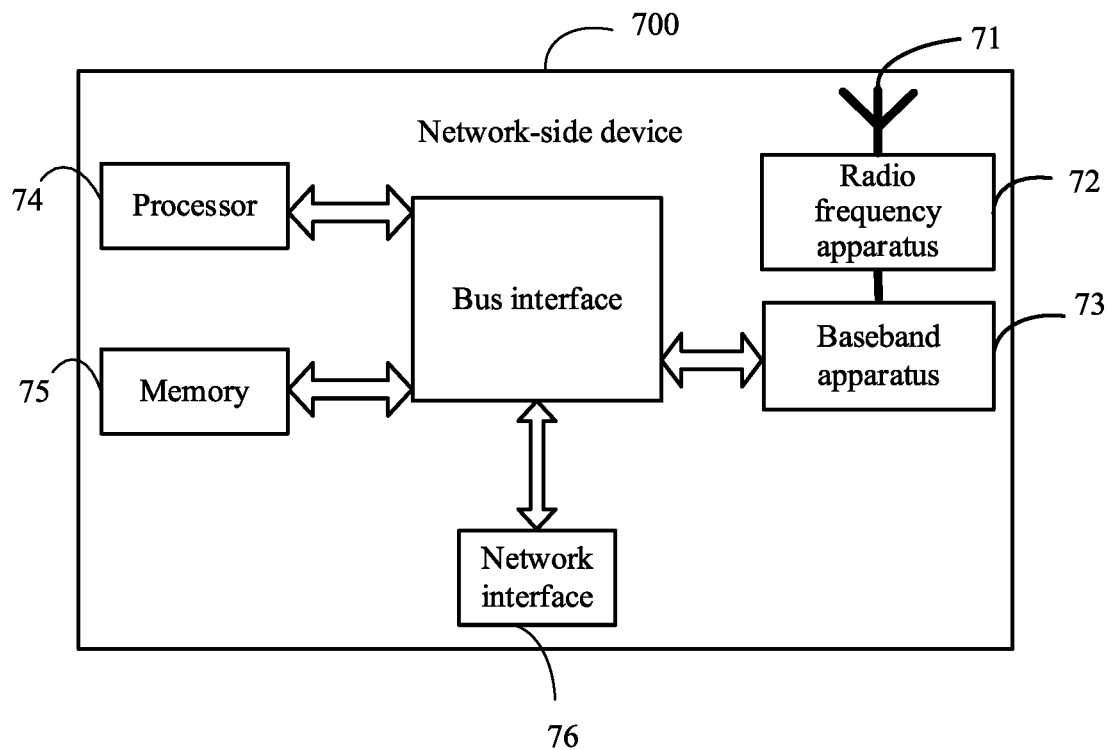
FIG. 5 is a block diagram of a network-side device according to an embodiment of the present invention.

Specifically, an embodiment of the present invention further provides a network-side device. As shown in FIG. 5, the network-side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The frequency band processing apparatus may be located in the baseband apparatus 73. The method performed by the network-side device in the foregoing embodiment may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 5, one of the chips is, for example, the processor 74, connected to the memory 75, so as to invoke a program in the memory 75 to perform the operation of the network-side device shown in the foregoing method embodiment.

The baseband apparatus 73 may further include a network interface 76, configured to exchange information with the radio frequency apparatus 72, where the interface is, for example, a common public radio interface (CPRI)

Herein, the processor may be one processor, or may be a collective term for a plurality of processing components. For example, the processor may be a CPU, or may be an ASIC, or is configured as one or more integrated circuits for implementing the method performed by the network-side device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double DataRate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 75 described in this application is intended to include but is not limited to these and any other suitable types of memories.

Specifically, the network-side device in this embodiment of the present invention further includes a computer program stored in the memory 75 and capable of running on the processor 74. The processor 74 invokes the computer program in the memory 75 to perform the method performed by the modules shown in FIG. 4.

An embodiment of the present invention further provides a computer-readable storage medium, where a computer program is stored in the computer-readable storage medium. When the computer program is executed by a processor, the steps of the foregoing method for configuring a quality of service parameter applied to the network-side device are implemented, with the same technical effects achieved. To avoid repetition, details are not described herein again.

Figure 6:
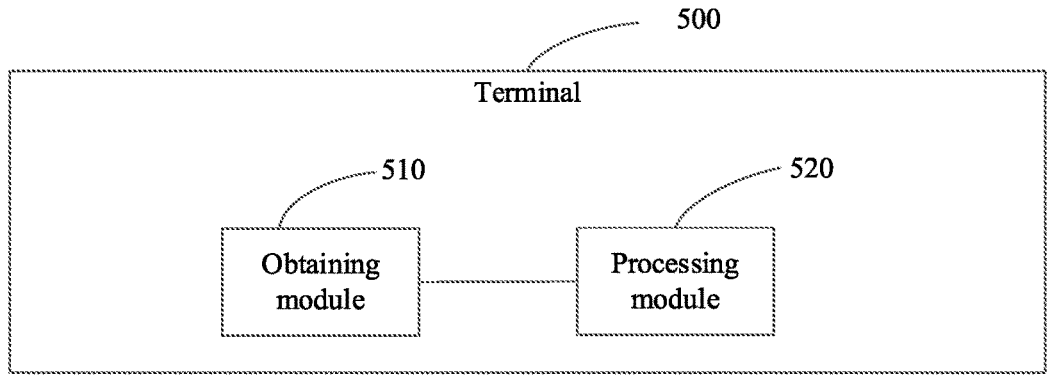
FIG. 6 is a schematic modular structural diagram of a terminal according to an embodiment of the present invention.

An embodiment of the present invention further provides an apparatus for configuring a quality of service parameter, applied to a terminal. As shown in FIG. 6, the terminal 500 includes:

an obtaining module 510, configured to obtain a mapping relationship between a QoS parameter set and an SLRB parameter set; and a processing module 520, configured to: perform matching between a QoS parameter of an arriving QoS service flow and the QoS parameter set, and in a case that the QoS parameter matches none of the QoS parameter sets, use a default SLRB parameter set to transmit the QoS service flow, or trigger RRC connection establishment.

In this embodiment, the network-side device configures the mapping relationship between the QoS parameter set and the SLRB parameter set for the terminal, and allows the terminal to trigger RRC connection establishment in the case that the QoS parameter of the terminal matches none of the configured QoS parameter sets, or indicates the default SLRB parameter set to the terminal, where the default SLRB parameter set is to be used in the case that the QoS parameter of the terminal matches none of the configured QoS parameter sets. In this way, the terminal in different states can obtain a corresponding SLRB parameter set, so that all terminals can configure quality of service parameters according to network expectation, thereby better controlling sidelink data transmission and improving user experience.

Optionally, the processing module 520 is configured to perform at least one of the following:

in a case that values of at least part of QoS parameters of the QoS service flow are equal to values of corresponding parameters in one QoS parameter set, determining that the QoS parameter of the QoS service flow matches the QoS parameter set; and in a case that the values of at least part of QoS parameters of the QoS service flow fall within value ranges of corresponding parameters in one QoS parameter set, determining that the QoS parameter of the QoS service flow matches the QoS parameter set.

Optionally, the obtaining module 510 is configured to perform at least one of the following:

receiving configuration information sent by a network-side device by using common signaling, where the configuration information includes the mapping relationship between the QoS parameter set and the SLRB parameter set, and specifically, the common signaling may be system information; and obtaining the mapping relationship that is between the QoS parameter set and the SLRB parameter set and that is preconfigured by the network-side device.

For terminals in an idle state or inactive state, the mapping relationship between the QoS parameter set and the SLRB parameter set may be configured by using system information; for offline terminals, the mapping relationship between the QoS parameter set and the SLRB parameter set may be preconfigured; and for terminals in a connected state, the mapping relationship between the QoS parameter set and the SLRB parameter set may be configured by using RRC dedicated signaling. In order to reduce signaling overheads, the mapping relationship between the QoS parameter set and the SLRB parameter set may be alternatively configured for the terminal by using common signaling.

Optionally, the apparatus further includes:
a sending module, configured to: if a QoS flow arrives, send a first configuration request message to the network-side device to request to obtain the configuration information. The network-side device may configure the mapping relationship between the QoS parameter set and the SLRB parameter set for the terminal after receiving the first configuration request message from the terminal.

Optionally, the configuration information further includes the default SLRB parameter set; or
the default SLRB parameter set is preconfigured.

When the configuration information includes the default SLRB parameter set, the configuration information further includes default parameter indication information, and the default parameter indication information indicates that one SLRB parameter set in the configuration information is the default SLRB parameter set.

Optionally, the configuration information may further indicate in an explicit manner or an implicit manner that the terminal triggers RRC connection establishment in a case that a QoS parameter of a to-be-initiated service matches none of the QoS parameter sets.

In the implicit manner, in a case that the default SLRB parameter set is not included in the configuration information and that a QoS parameter of a to-be-initiated service matches none of the QoS parameter sets in the configuration information, the processing module 520 may trigger RRC connection establishment.

In the explicit manner, in a case that first signaling is received from the network-side device and that the QoS parameter of the to-be-initiated service matches none of the QoS parameter sets in the configuration information, the processing module 520 may trigger RRC connection establishment, where the first signaling indicates that the terminal triggers RRC connection establishment in the case that the QoS parameter of the to-be-initiated service matches none of the QoS parameter sets.

The to-be-initiated service is configured by the network-side device or is predefined.

After an RRC connection has been established, the sending module is further configured to send a second configuration request message to the network-side device, where the second configuration request message includes a QoS requirement of the terminal; and receive an SLRB parameter that is corresponding to the QoS requirement and that is sent by the network-side device. In this way, the network-side device can dynamically configure the SLRB parameter for the terminal according to the QoS requirement of the terminal.

The SLRB parameter set includes at least one of the following parameters:
an L1-layer transmission parameter;
an L2-layer transmission parameter;
an indication on whether a media access control MAC performs HARQ retransmission; and
the maximum number of retransmissions.

In a case that the SLRB parameter set includes a parameter indicating whether the MAC performs HARQ retransmission, the configuration information further indicates in an explicit manner or an implicit manner that the terminal triggers RRC connection establishment in a case that a configured HARQ feedback resource does not match a terminal capability.

Optionally, after an RRC connection has been established, the sending module is further configured to send a HARQ feedback resource request message to the network-side device, where the HARQ feedback resource request message is for requesting to obtain a HARQ feedback resource matching the terminal capability.

For example, the configured HARQ feedback resource is at a fixed position, for example, being at a fixed position 1 ms or 3 ms behind the transmission resource. If the HARQ feedback resource configured for the terminal is fixed at 1 ms, and the terminal has weak capability and cannot perform HARQ feedback at the fixed position of 1 ms behind the transmission resource, the terminal needs to trigger RRC connection establishment and enter the connected state, to request the network-side device for a resource pool with a 3-ms feedback delay.

To better achieve the foregoing objective, an embodiment of the present invention further provides a terminal. The terminal includes a processor, a memory, and a computer program stored in the memory and capable of running on the processor, where when the computer program is executed by the processor, the steps of the foregoing method for configuring a quality of service parameter are implemented, with same technical effects achieved. To avoid repetition, details are not described herein again.

Figure 7:
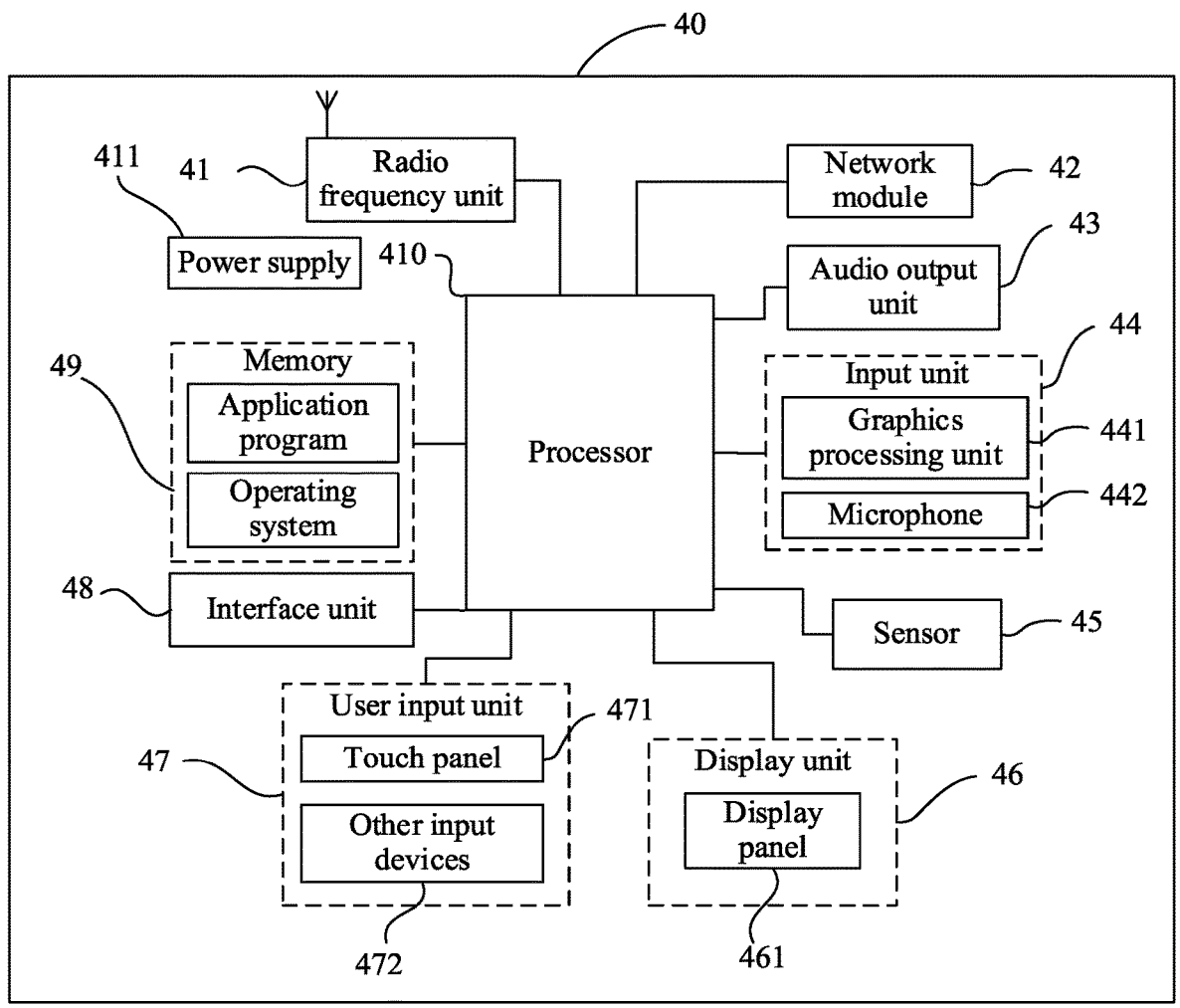
FIG. 7 is a block diagram of a terminal according to an embodiment of the present invention.

Further, FIG. 7 is a schematic structural diagram of hardware of a terminal for implementing the embodiments of the present invention. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 7 does not constitute any limitation on the terminal device. The terminal may include more or fewer components than those shown in the figure, or a combination of some components, or the components disposed differently. In this embodiment of the present invention, the terminal includes but is not limited to a mobile phone, a tablet computer, a laptop computer, a personal digital assistant, an in-vehicle terminal, a wearable device, a pedometer, and the like.

It should be understood that in this embodiment of the present invention, the radio frequency unit 41 may be configured to: receive and transmit signals in an information receiving/sending process or a call process; and specifically, after receiving downlink data from a base station, transmit the downlink information to the processor 410 for processing, and in addition, transmit uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may also communicate with a network and other devices via a wireless communications system.

The terminal provides a user with wireless broadband internet access through the network module 42, for example, helping the user to transmit and receive e-mails, browse web pages, and access streaming media.

The audio output unit 43 may convert audio data received by the radio frequency unit 41 or the network module 42 or stored in the memory 49 into an audio signal and output the audio signal as a sound. Furthermore, the audio output unit 43 may also provide audio output (for example, a call signal received sound or a message received sound) related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a still picture or video obtained by an image capture apparatus (such as a camera) in a video capture mode or an image capture mode. A processed image frame may be displayed on the display unit 46. The image frame processed by the graphics processing unit 441 may be stored in the memory 49 (or another storage medium) or be sent by the radio frequency unit 41 or the network module 42. The microphone 442 is capable of receiving sounds and processing such sounds into audio data. The processed audio data can be converted into a format output that can be sent to a mobile communication base station through the radio frequency unit 41 in a telephone call mode.

The mobile terminal 40 may further include at least one sensor 45, for example, a light sensor, a motion sensor, and another sensor. Specifically, the light sensor may include an ambient light sensor and a proximity sensor. The ambient light sensor may adjust luminance of the display panel 461 based on brightness of ambient light, and the proximity sensor may turn off the display panel 461 and/or backlight when the terminal 40 moves close to an ear. As a motion sensor, an accelerometer sensor may detect the magnitude of acceleration in each direction (generally three axes), and in a stationary state, may detect the magnitude and direction of gravity, and may be used to recognize terminal postures (for example, shift between a landscape orientation and a portrait orientation, related games, and magnetometer posture calibration), and vibration recognition-related functions (such as a pedometer and knocking), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein again.

The display unit 46 is configured to display information input by the user or information provided to the user. The display unit 46 may include a display panel 461, and the display panel 461 may be configured in a form of a liquid crystal display (LCD), an organic light-emitting diode (OLED), or the like.

The user input unit 47 may be configured to: receive a digit or character information that is input, and generate signal input related to user settings and function control of the terminal. Specifically, the user input unit 47 may include a touch panel 471 and other input devices 472. The touch panel 471 is also referred to as a touchscreen and can collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 410, and can receive a command sent by the processor 410 and execute the command. In addition, the touch panel 471 may be implemented in a plurality of forms, for example, as a resistive, capacitive, infrared, or surface acoustic wave touch panel. The user input unit 47 may further include other input devices 472 in addition to the touch panel 471. Specifically, the other input devices 472 may include but are not limited to a physical keyboard, a function key (such as a volume control key or a switch key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. In FIG. 7, the touch panel 471 and the display panel 461 serve as two independent components to implement input and output functions of the terminal. In some embodiments, however, the touch panel 471 may be integrated with the display panel 461 to implement the input and output functions of the terminal. Details are not limited herein.

The interface unit 48 is an interface between an external apparatus and the terminal 40. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 48 may be configured to receive an input (for example, data information or power) from an external apparatus and transmit the received input to one or more elements within the terminal 40, or may be configured to transmit data between the terminal 40 and the external apparatus.

The memory 49 may be configured to store software programs and various data. The memory 49 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 49 may include a high-speed random access memory, and may further include a non-volatile memory such as a disk storage device, a flash memory device, or another volatile solid-state storage device.

The processor 410 is a control center of the terminal, uses various interfaces and lines to connect parts of the entire terminal, and executes various functions and processing data of the terminal by running or executing software programs and/or modules stored in the memory 49 and invoking data stored in the memory 49, so as to perform overall monitoring on the terminal. The processor 410 may include one or more processing units. Preferably, an application processor and a modem processor may be integrated in the processor 410. The application processor primarily processes an operating system, user interfaces, application programs, and the like. The modem processor primarily processes radio communication. It can be understood that the modem processor may be alternatively not integrated in the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not illustrated. Details are not described herein.

The terminal may be a wireless terminal or a wired terminal. The wireless terminal may be a device that provides a user with voice and/or other service data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station (, a mobile station, a mobile terminal (Mobile), a remote station, a remote terminal, an access terminal, a user terminal, a user agent, or a user device (User Equipment), which is not limited herein.

An embodiment of the present invention further provides a computer-readable storage medium, where a computer program is stored in the computer-readable storage medium. When the computer program is executed by a processor, the processes of the embodiment of the foregoing method for configuring a quality of service parameter on the terminal side can be implemented, with same technical effects achieved. To avoid repetition, details are not described herein again. The computer-readable storage medium is, for example, a read-only memory (ROM), a random access memory (RAM), a magnetic disk, or an optical disc.

It should be noted that, it should be understood that division of modules of the network-side device and the terminal is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules may be configured as one or more integrated circuits for implementing the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by the processing component, the processing component may be a general processor, for example, a central processing unit (CPU) or other processors that may invoke program code. For another example, the modules may be integrated and implemented in a form of a system-on-a-chip (SOC).

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network-side device) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

In addition, it should be noted that in the apparatus and method of the present invention, apparently, the components or steps may be decomposed and/or recombined. Such decomposition and/or recombination should be considered as an equivalent solution of the present invention. Further, the steps of performing the afore-mentioned series of processing may be naturally performed in an order of the description or in a time order, but is not necessarily performed in a time order. Some steps may be performed in parallel or independently of each other. Those skilled in the art can understand that all or any steps or components of the method and apparatus of the present invention can be implemented by hardware, firmware, software, or a combination thereof in any computing apparatus (including a processor, a storage medium, and the like) or a network with a computing apparatus. This can be implemented by those of ordinary skill in the art by using their basic programming skills in the case of reading the present invention.

Therefore, the objectives of the present invention can also be implemented by running a program or a set of programs on any computing apparatus. The computing apparatus may be a well-known general-purpose apparatus. Therefore, the objectives of the present invention may also be implemented only by a program product that contains program code for implementing the method or apparatus. That is, such program product also constitutes the present invention, and a storage medium storing such program product also constitutes the present invention. Obviously, the storage medium may be any known storage medium or any storage medium developed in the future. It should be also noted that in the apparatus and method of the present invention, apparently, the components or steps may be decomposed and/or recombined. Such decomposition and/or recombination should be considered as an equivalent solution of the present invention. Further, the steps of performing the afore-mentioned series of processing may be naturally performed in an order of the description or in a time order, but is not necessarily performed in a time order. Some steps may be performed in parallel or independently of each other.

The foregoing descriptions are preferred implementations of the present invention. It should be noted that a person of ordinary skill in the art may make several improvements and polishing without departing from the principle described in the present invention and the improvements and polishing shall fall within the protection scope of the present invention.

What is claimed is:

1. A method for configuring a quality of service (QOS) parameter, applied to a network-side device and comprising:
   configuring a mapping relationship between a QoS parameter set and a sidelink radio bearer (SLRB) parameter set for a terminal; and
   in a case that a QoS parameter of the terminal does not match the QoS parameter set, allowing the terminal to trigger radio resource control RRC) connection establishment;
   wherein the configuring a mapping relationship between a QoS parameter set and an SLRB parameter set for a terminal comprises:
   sending configuration information to the terminal by using common signaling, wherein the configuration information comprises the mapping relationship between the QoS parameter set and the SLRB parameter set;
   wherein the SLRB parameter set comprises a parameter indicating whether a media access control (MAC) performs hybrid automatic repeat request (HARQ) retransmission, and the configuration information further indicates in an explicit manner or an implicit manner that the terminal triggers RRC connection establishment in a case that a configured HARQ feedback resource does not match a terminal capability.

2. The method for configuring a quality of service parameter according to claim 1, further comprising:
   receiving a first configuration request message from the terminal, wherein the first configuration request message is sent by the terminal when a QoS flow arrives, and the first configuration request message is for requesting to obtain the configuration information.

3. The method for configuring a quality of service parameter according to claim 1, wherein the configuration information further indicates in an explicit manner or an implicit manner that the terminal triggers RRC connection establishment in a case that a QoS parameter of a to-be-initiated service matches none of the QOS parameter sets.

4. The method for configuring a quality of service parameter according to claim 3, wherein the indicating in an implicit manner that the terminal triggers RRC connection establishment in a case that a QoS parameter of a to-be-initiated service matches none of the QoS parameter sets comprises:
   in a case that the default SLRB parameter set is not comprised in the configuration information, triggering by default or allowing the terminal to trigger RRC connection establishment in a case that the QoS parameter of the to-be-initiated service matches none of the QoS parameter sets;
   or
   wherein the indicating in an explicit manner that the terminal triggers RRC connection establishment in a case that a QoS parameter of a to-be-initiated service matches none of the QoS parameter sets comprises:
   indicating, by using first signaling, that the terminal triggers RRC connection establishment in a case that the QoS parameter of the to-be-initiated service matches none of the QOS parameter sets;
   or
   wherein after an RRC connection has been established, the method further comprises:
   receiving a second configuration request message of the terminal, wherein the second configuration request message comprises a QoS requirement of the terminal; and
   sending, to the terminal, an SLRB parameter corresponding to the QoS requirement.

5. The method for configuring a quality of service parameter according to claim 1, wherein the SLRB parameter set further comprises at least one of the following parameters:
   an L1-layer transmission parameter;
   an L2-layer transmission parameter; and
   the maximum number of retransmissions.

6. The method for configuring a quality of service parameter according to claim 1, wherein
   the configuration information further comprises a HARQ feedback delay parameter.

7. The method for configuring a quality of service parameter according to claim 1, wherein after an RRC connection has been established, the method further comprises:

receiving a HARQ feedback resource request message from the terminal, wherein the HARQ feedback resource request message is for requesting to obtain a HARQ feedback resource matching the terminal capability.

8. A network-side device, comprising a processor, a memory, and a computer program stored in the memory and capable of running on the processor, wherein the computer program, when executed by the processor, implements:

configuring a mapping relationship between a quality of service (QOS) parameter set and a sidelink radio bearer (SLRB) parameter set for a terminal; and in a case that a QoS parameter of the terminal does not match the QoS parameter set, allowing the terminal to trigger radio resource control (RRC) connection establishment;

wherein the configuring a mapping relationship between a QoS parameter set and an SLRB parameter set for a terminal comprises:

sending configuration information to the terminal by using common signaling, wherein the configuration information comprises the mapping relationship between the QoS parameter set and the SLRB parameter set;

wherein the SLRB parameter set comprises a parameter indicating whether a media access control (MAC) performs hybrid automatic repeat request (HARQ) retransmission, and the configuration information further indicates in an explicit manner or an implicit manner that the terminal triggers RRC connection establishment in a case that a configured HARQ feedback resource does not match a terminal capability.

9. The network-side device according to claim 8, wherein the configuration information further comprises a HARQ feedback delay parameter.

10. The network-side device according to claim 8, wherein the computer program, when executed by the processor, further implements:

after an RRC connection has been established, receiving a HARQ feedback resource request message from the terminal, wherein the HARQ feedback resource request message is for requesting to obtain a HARQ feedback resource matching the terminal capability.

11. A method for configuring a quality of service (QOS) parameter, applied to a terminal and comprising:

obtaining a mapping relationship between a QoS parameter set and a sidelink radio bearer (SLRB) parameter set; and performing matching between at least one QoS parameter of an arriving QoS service flow and the QoS parameter set, and in a case that the at least one QoS parameter does not match the QoS parameter set, triggering radio resource control (RRC) connection establishment;

wherein the obtaining a mapping relationship between a QoS parameter set and an SLRB parameter set comprises:

receiving configuration information sent by a network-side device by using common signaling, wherein the configuration information comprises the mapping relationship between the QoS parameter set and the SLRB parameter set;

wherein the SLRB parameter set comprises a parameter indicating whether media access control (MAC) performs hybrid automatic repeat request (HARQ) retransmission, and the configuration information further indicates in an explicit manner or an implicit manner that the terminal triggers RRC connection establishment in a case that a configured HARQ feedback resource does not match a terminal capability.

12. The method for configuring a quality of service parameter according to claim 11, wherein the performing matching between at least one QoS parameter of an arriving QoS service flow and the QoS parameter set comprises at least one of the following:

in a case that values of at least part of the at least one QoS parameters of the arriving QoS service flow are equal to values of corresponding parameters in the QoS parameter set, determining that the at least one QoS parameter of the arriving QoS service flow matches the QoS parameter set; and in a case that the values of at least part of the at least one QoS parameters of the arriving QOS service flow fall within value ranges of corresponding parameters in the QoS parameter set, determining that the at least one QoS parameter of the arriving QoS service flow matches the QoS parameter set.

13. The method for configuring a quality of service parameter according to claim 11, further comprising:

if a QoS flow arrives, sending a first configuration request message to the network-side device to request to obtain the configuration information.

14. The method for configuring a quality of service parameter according to claim 11, wherein the SLRB parameter set further comprises at least one of the following parameters:

an L1-layer transmission parameter;

an L2-layer transmission parameter; and the maximum number of retransmissions.

15. The method for configuring a quality of service parameter according to claim 11, wherein in a case that first signaling is received from the network-side device and that the QoS parameter of the to-be-initiated service matches none of the QoS parameter sets in the configuration information, triggering RRC connection establishment, wherein the first signaling indicates that the terminal triggers RRC connection establishment in the case that the QoS parameter of the to-be-initiated service matches none of the QoS parameter sets.

16. The method for configuring a quality of service parameter according to claim 15, wherein after RRC connection establishment has been triggered, the method further comprises:

sending a second configuration request message to the network-side device, wherein the second configuration request message comprises a QOS requirement of the terminal; and receiving an SLRB parameter that is corresponding to the QoS requirement and that is sent by the network-side device.

17. The method for configuring a quality of service parameter according to claim 11, wherein the configuration information further comprises a HARQ feedback delay parameter.

18. The method for configuring a quality of service parameter according to claim 17, wherein after an RRC connection has been established, the method further comprises:

sending a HARQ feedback resource request message to the network-side device, wherein the HARQ feedback resource request message is for requesting to obtain a HARQ feedback resource matching the terminal capability;

or the method further comprises:

based on the parameter indicating whether the MAC performs HARQ retransmission and the HARQ feedback delay parameter, selecting a resource pool to send data of the QoS service flow, wherein a feedback delay of the selected resource pool is not greater than the HARQ feedback delay parameter.

19. A terminal, comprising a processor, a memory, and a computer program stored in the memory and capable of running on the processor, wherein when the computer program is executed by the processor, the steps of the method for configuring a quality of service parameter according to claim 11 are implemented.

20. The terminal according to claim 19, wherein the configuration information further comprises a HARQ feedback delay parameter.

* * * * *